United States Patent [19]

Kottmann

[11] 3,971,355
[45] July 27, 1976

[54] PISTON ROD-CONNECTING ROD INTERCONNECTIONS FOR INTERNAL COMBUSTION ENGINES

[75] Inventor: Helmut Kottmann, Urbach, Germany

[73] Assignee: Mahle GmbH, Stuttgart, Germany

[22] Filed: Sept. 4, 1974

[21] Appl. No.: 503,133

[30] Foreign Application Priority Data
Sept. 7, 1973  Germany............................ 2345223

[52] U.S. Cl...................... 123/197 A; 123/197 AB; 123/193 P; 74/579 E; 92/238; 92/187
[51] Int. Cl.²......................................... F02B 75/32
[58] Field of Search...... 123/193 P, 197 A, 197 AB; 92/187, 238; 29/156.5 A; 74/579 E

[56] References Cited
UNITED STATES PATENTS

| | | | |
|---|---|---|---|
| 984,250 | 2/1911 | Wiesner............................ | 123/193 P |
| 1,491,155 | 4/1924 | McKone ............................... | 92/187 |
| 1,684,862 | 9/1928 | Gay....................................... | 92/187 |
| 2,806,752 | 9/1957 | Ginn .................................. | 29/156.5 A |
| 3,161,185 | 12/1964 | Justinien et al................... | 92/187 X |

Primary Examiner—Charles J. Myhre
Assistant Examiner—William Andrew
Attorney, Agent, or Firm—William A. Drucker

[57] ABSTRACT

A piston has a pair of support members extending away from the piston head offset from a piston ring portion, a piston rod being carried on a connecting rod which is clamped between the support members by a bolt. The bolt is loosely received in a bore in the connecting rod, the force between the piston and the piston rod being taken by a frictional force between the connecting rod and the support members to prevent a bending force being applied to the bolt.

4 Claims, 3 Drawing Figures

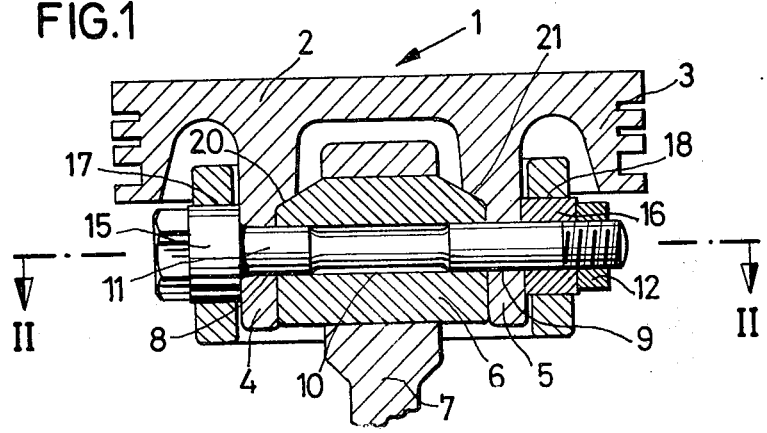
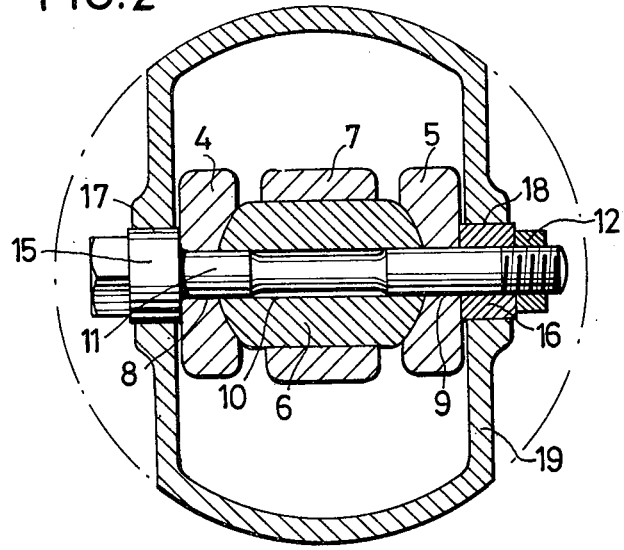
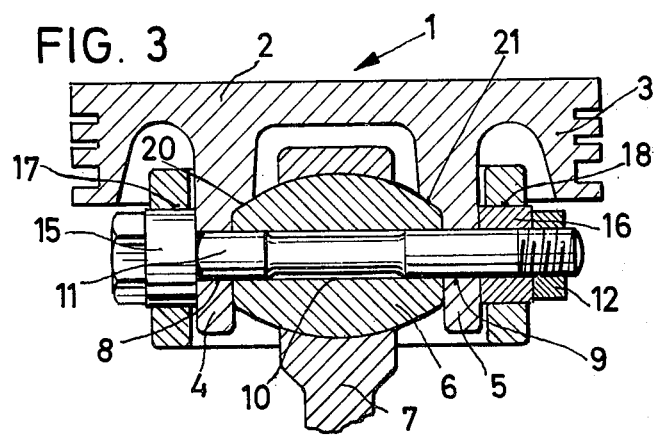

PISTON ROD-CONNECTING ROD INTERCONNECTIONS FOR INTERNAL COMBUSTION ENGINES

BACKGROUND OF THE INVENTION

1. Field of the Invention.

The present invention relates to a piston and piston rod arrangement for reciprocating piston engines with a connecting rod which is bolted to the piston.

2. Description of the Prior Art.

In French Pat. No. 363,099 use is made of a connecting rod which is hollow in the longitudinal direction. This connecting rod is penetrated by a gudgeon pin in the form of a bolt which fixes it in its position in relation to the piston skirt. The bolt which receives the connecting rod comprises, at one end, a moulded-on head and, at its other end, a screwed-on nut. Head and nut butt positively agaist the piston skirt at their surfaces which face the connecting rod and along their radial circumferential surfaces. Furthermore, the bolt is mounted in the piston skirt in opposite and aligned bores. These bores, which receive the connecting rod, have to be machined with great precision and, consequently, involve high costs. The hollow connecting rod rests, over its entire length and with a relatively close fit, on the bolt which holds it. In this construction, the forces acting on the rod directly reach the bolt which holds this rod. By this means, the latter is subjected to very severe bending stress, which, as is known, is extremely unfavourable for bolts. Moreover, this bending stress is also transmitted to the cylindrical piston skirt, whereby the latter can be deformed as far as the annular portions.

German Pat. No. 812,746 shows an arrangement in which the connecting rod is provided at its ends, with flattened areas, with which it butts against the piston. The ends of the rod are connected to the piston by bolts which are guided parallel to the longitudinal axis of the piston. These bolts are not mounted in reinforcements which start from the piston base, but are mounted in reinforcements which are moulded on the piston skirt.

SUMMARY OF THE INVENTION

The object of the invention is to provide a solution according to which these disadvantages can be avoided as far as possible. A further object of the invention is to provide a connecting rod which is secured to the piston by a bolt connection, as short as possible and in a form which is unweakened from the point of view of strength of design and to mount it without any complicated fits. At the same time, the bolt which penetrates the rod and clamps the latter to the piston, is to be kept free from bending stresses to the greatest possible extent. Furthermore, the weight of the rod and its bolt connection is to be reduced with a view to lowering the moving mass of the drive mechanism.

According to the invention, there is provided a piston and piston rod arrangement for a reciprocating piston engine, said arrangement comprising:

a. a piston having a piston head, a piston ring portion and a pair of support members integral with said piston head and extending away from said piston head in spaced relationship with respect to the piston ring portion;

b. a connecting rod positioned between and in contact with said support members, said connecting rod being so shaped as to define a bore therethrough;

c. a piston rod carried on said connecting rod;

d. a bolt passing through said support members and through said bore to exert a clamping force between said support members and said connecting rod, the bolt having an intermediate portion which passes through said bore and which has a diameter less than that of said bore; and e. cooperating shoulders formed on said connecting rod and said support members to prevent movement of said connecting rod in a direction towards said piston head.

A bolt made of light metal is particularly suitable for use in this construction. This applies especially with regard to the strength of the mounting by friction grip at rising temperatures during operation of the drive mechanism. The frictional resistance between the connecting rod end faces and the support members, is decisive for the support of the connecting rod, the force required for the frictional grip emerging from the bolt which braces the connecting rod. The bolt itself may be designed as a necked-down bolt, in order to absorb the high tensile stress. If possible, the rod should not firmly butt agaist this bolt at any point, i.e. its exact position is not to be determined by resting on the bolt circumference.

The shoulders which are fitted on the support members, which, serve for receiving the rod during installation and for securely fixing it during the operation of the drive mechanism. These shoulders absorb, during operation of the drive mechanism, a part of the ignition force acting on the connecting rod and thus contribute to relieving the friction grip connection. Therefore, the friction grip connection alone only has to securely absorb the forces of inertia which arise when the piston changes its direction. Since the necked-down bolts are tightened with pretension, the support of the rod is, apart from the mentioned shoulders, always reliably ensured during operation of the drive mechanism.

Light metal is particularly suitable as material for the rod because a reduction in the weight of the moving masses of the drive mechanism is achieved by the light metal, on the one hand, and a favourable matching of material is brought about with respect to the entire bolt connection. As a result of the high coefficient of expansion relative to light metal, the rod expands substantially more at a rise in temperature than does the necked-down bolt which braces the rod and which is made of steel or an alloy thereof. By this means, the friction grip support practically increases during operation of the drive mechanism at a raised temperature and an additional safeguard is given for the durability of the friction grip.

Over and above this, the use of light metal for the connecting rod and its form in accordance with the present invention presents the advantage that it is possible to mount the piston rod, to which the connecting rod is pivoted, in a particularly advantageous manner. The light metal of the pin, which can be for example Al Si 12, can possibly make superfluous the use of a special bearing material between piston rod and connecting rod. Furthermore, the surface of the connecting rod, which carries the piston rod, can additionally be arched in design, whereby it is possible to bring about an oscillation of the piston rod in a plane which is opened up by the longitudinal axis of the connecting rod and by the centre axis of the piston.

The mentioned reinforcements of German Pat. No. 812,746 which start from the piston skirt or piston ring portion, differ in their function from the bearings of the connecting rods according to the present invention because the screw axes run in completely different directions. The axis of the single bolt in the present invention lies in the direction of the longitudinal axis of the rod, whilst the axes of the bolts in any one of the prior art documents extend perpendicularly to the connecting rod. Therefore, it is basically impossible to transfer the findings relating to one of these prior art modes of construction to the present invention.

Consequently, the present invention may be distinguished through the following advantages: The piston pin is securely held, in the direction of the longitudinal axis of the piston, exclusively by frictional resistance and by shoulders which are moulded onto support members which extend from the piston head, during the entire operation of the arrangement. The clamping bolt which is guided through the hollow space of the connecting rod is not subjected to any bending stress by the rod. Moreover, the rod is very easy to fit, since, in contrast with the solution according to German Pat. No. 812,746, only one single, easily accessible bolt is provided.

BRIEF DESCRIPTION OF THE DRAWING

FIG. 1 shows a part of the arrangement in a section along the longitudinal axis of the piston;

FIG. 2 shows a section along the line II—II according to FIG. 1; and

FIG. 3 shows a part of the arrangement, according to another embodiment of the invention, in a section along the piston axis.

DESCRIPTION OF THE PREFERRED EMBODIMENTS

The piston 1 comprises a piston head 2 and an annular zone 3. Band-like support members 4 and 5, which are directed parallel to the longitudinal axis of the piston, project from the interior of the piston head 2. Between these extensions, a connecting rod 6 is arranged, which is embraced by the head of a piston rod 7. The support members 4 and 5 and the rod 6 are penetrated by bores 8, 9 and 10, which are in alignment with one another. A bolt 11 is guided through the latter, which is tightened by a nut 12.

The rod 6 is very short in relation to its diameter and is held between the support members 4 and 5 by the frictional forces, applied by the bolt 11, as well as by the shoulders 20 and 21 which are moulded to the support members 4 and 5. To ensure that the bolt 11 is, under no circumstances, subjected to bending stress, a clearance is provided between its shank and the bores 8 and 9 in the support members 4 and 5 as well as between the shank and the bore 10 in the rod 6.

The exemplified embodiments shown have, in addition, respectively a peg-shaped piece 15 between the shank of the bolt 11 and its head. At the other end of the bolt there is arranged, in front of the nut 12 a sleeve 16, which corresponds, as regards its external diameter, to the peg-shaped piece 15. The peg 15 and the sleeve 16 engage into corresponding bores 17 and 18 of a shank part 19. The shank part 19 is, in other words, completely separated from the rest of the piston and is only rotatably connected to it via the bolt 11. This construction thus represents a so-called pendulating shank piston, which has the great advantage that the shank can guide the piston in the cylinder without being influenced by the head, which only serves for transmitting the gas force and for sealing the combustion chamber. The invention is not limited to pendulating shank pistons, i.e. the head and shank can be integrally formed.

In the embodiment shown in FIG. 3, the surface of the connecting rod is arched in design, so that is possible for the piston rod to pendulate in a plane which is defined by the longitudinal axis of the connecting rod and the centre axis of the piston.

Hereinafter, technical data is given for a practical exemplified embodiment.

| | |
|---|---|
| Weight of the entire piston, namely of the piston head, including the piston rings as well as the piston shank: | 0.4 kg |
| Diameter of the piston head: | 90 m.m. |
| Dimension of the bolt screw clamping the connecting rod: | |
| Length: 75 mm | thread: M 10 × 1.25 |
| Bolt material: | 42 Cr Mo V4 |
| Torque to be applied for clamping the bolt | 50 Nm |
| Connecting rod material: | AL Si 12 |
| Frictional grip area, effective in the direction of the longitudinal axis of the piston, between the connecting rod and the extensions starting from the piston head. | 2 × 4 cm² |

The piston is suitable for an operation of up to 8500 strokes per minute.

The gas force which comes to act on the connecting rod can be up to 50,000 N.

The clamping power is chosen so that it is preferably more than double the value of the product from the mass of the piston and its maximum acceleration at top dead centre.

I claim:

1. A piston and piston rod arrangement for a reciprocating piston engine, said arrangement comprising:
    a. a piston having a piston head, a piston ring portion and a pair of support members integral with said piston head and extending away from said piston head in spaced relationship with respect to the piston ring portion;
    b. a connecting rod positioned between and in contact with said support members, said connecting rod being so shaped as to define a bore therethrough;
    c. a piston rod carried on said connecting rod;
    d. a bolt passing through said support members and through said bore to exert a clamping force between said support members and said connecting rod, the bolt having an intermediate portion which passes through said bore and which has a diameter less than that of said bore; and
    e. cooperating shoulders formed on said connecting rod and said support members to prevent movement of said connecting rod in a direction towards said piston head.

2. An arrangement according to claim 1 in which said bolt exerts a clamping force between said support members and said connecting rod, which clamping force is greater than the product of the mass of the piston and its maximum acceleration at top dead centre.

3. An arrangement according to claim 2 in which said clamping force is at least double said product.

4. An arrangement according to claim 1 in which said connecting rod is arched in the longitudinal direction of the connecting rod.

* * * * *